United States Patent
Roberds et al.

[11] Patent Number: 5,942,265
[45] Date of Patent: Aug. 24, 1999

[54] PROCESS AND APPARATUS FOR PREPARING PEPPERONI

[75] Inventors: James Roberds; Luke B. Rainbolt, both of Keller; Kyle A. Newkirk, North Richland Hills, all of Tex.

[73] Assignee: H&M Food Systems Company, Inc., Fort Worth, Tex.

[21] Appl. No.: 09/061,584

[22] Filed: Apr. 16, 1998

[51] Int. Cl.⁶ .................... A23L 1/31; A01J 1/10; A23B 4/03; A47J 37/10
[52] U.S. Cl. .................... 426/59; 426/465; 426/513; 426/517; 426/646; 99/355; 99/443 C; 99/470; 99/537
[58] Field of Search ............... 426/513, 516, 426/517, 518, 520, 524, 59, 465, 466, 473, 512, 523, 646; 99/355, 443 C, 470, 537, 443 R, 448, 473, 477, 478, 479, 483

[56] References Cited

U.S. PATENT DOCUMENTS

| | | | |
|---|---|---|---|
| Re. 35,259 | 6/1996 | Williams | 126/369 |
| 2,346,232 | 4/1944 | Pirot et al. | 99/208 |
| 3,482,996 | 12/1969 | Christianson et al. | 99/109 |
| 3,664,396 | 5/1972 | Tremblay | 146/78 A |
| 3,831,389 | 8/1974 | Lipona | 62/63 |
| 4,079,666 | 3/1978 | Plemons et al. | 99/355 |
| 4,166,138 | 8/1979 | Ziminski et al. | 426/249 |
| 4,196,222 | 4/1980 | Chenye | 426/264 |
| 4,200,959 | 5/1980 | Cheney | 17/32 |
| 4,218,492 | 8/1980 | Stead et al. | 426/646 |
| 4,260,640 | 4/1981 | Hartmann et al. | 426/516 |
| 4,265,918 | 5/1981 | Kueper et al. | 426/264 |
| 4,279,935 | 7/1981 | Kentor | 426/264 |
| 4,305,965 | 12/1981 | Cheney | 426/104 |
| 4,362,750 | 12/1982 | Swartz | 426/59 |
| 4,530,132 | 7/1985 | Wagner | 17/45 |
| 4,667,369 | 5/1987 | Felstehausen | 17/32 |
| 4,927,650 | 5/1990 | Roberts | 426/295 |
| 5,078,120 | 1/1992 | Hwang | 126/121 A |
| 5,236,731 | 8/1993 | Becker | 426/513 |
| 5,736,186 | 4/1998 | Holdren et al. | 426/646 |

*Primary Examiner*—David Lacey
*Assistant Examiner*—Drew Becker
*Attorney, Agent, or Firm*—Foley & Lardner

[57] ABSTRACT

A process and apparatus for preparing diced or sliced pepperoni includes the steps of preparing the pepperoni meat mixture by grinding and mixing to specification. The blended sausage is extruded into sheet form for fermentation and cooking, following which the cooled meat mixture is chilled to 35° F. or lower and sliced or sliced and diced. The product is thereafter conveyed to a spiral dryer where it is exposed to relatively warm (about 50° F. to 120° F.) air at an initial relative humidity of 30% or less under turbulent air flow. The dried pepperoni is conveyed to a chiller or freezer. The pepperoni has desirable flow characteristics when compared to product made using known pepperoni manufacturing processes.

26 Claims, 3 Drawing Sheets

PROCESS AND APPARATUS FOR PREPARING PEPPERONI

Cross References to Related Applications, If Any: None.

BACKGROUND OF THE INVENTION

1. Field of The Invention

The present invention relates generally to the art of preparing a dry or semi-dry sausage product, and more particularly to a method of making pepperoni. In its most preferred form, the present invention relates to the preparation of diced or sliced pepperoni, wherein the sausage is cooked without using casings and wherein the dehydrating step is performed in a spiral dryer under turbulent air.

2. Description of the Prior Art

Many different processes have been used in the prior art to manufacture cured, smoked, dried and semi-dried sausages, and many such processes are known for preparing pepperoni. In some of the prior art processes, the initial meat mixture is cured and thereafter dried or heated in air, sunlight, in drying rooms, smokehouses and the like. The cure or drying time in many of the historical processes, and some processes still being used, require many hours, days or even weeks. A wide variety of final products and qualities results from the use of age-old recipes and techniques.

Pepperoni is typically prepared by stuffing the desired meat mixture into fibrous casings and curing the resultant product for extended periods. This particular sausage is most commonly served in thin slices, with or without the casing, the casing being removed after cooking if it is removed at all. Pepperoni pizzas, for example, are sold by most pizza producers throughout the world.

One prior art attempt at reducing the time required for the preparation of such sausage products is described in U.S. Pat. No. 2,346,232 issued Apr. 11, 1944 to Pirai, et al. for "Meat Process". In this patent, semi-dried meat for food ration purposes is prepared in shorter periods than were previously required, by exposing the meat mixture to a turbulent air flow to reduce the moisture content from an original 45–85% to 20–55%. The air used in this process is at a temperature of 0° C.–30° C. (32° F. to 86° F.) and the air is moved across the meat surface at a velocity of 1–18 feet/second. The meat products discussed in this patent are produced in ¼–1¼ inch thick layers or in ropes of ⅜-inch diameter for drying. For ⅜-inch ropes, drying is accomplished to 28% in about 8–13 hours, while the 1¼-inch layers require 13 days, still a relatively short period when compared to earlier processes. The benefits of turbulent flow are said to be increased by 40% early in the process where the air contacts a moist surface. The effect of the turbulent air flow of this patent is substantially reduced as the drying continues. For example, in one test reported in the patent, drying of ⅜-inch ropes from 55% to 40% moisture took just three hours, while a further reduction to 28% required an additional five hours. It is interesting to note that the patent does not disclose any direct relationship between the humidity of the air used in the process and the time of drying. The patent claims up to 75% relative humidity, although many of the examples use relative humidities of 20–25%, 40% and 75%. Product is held in flat trays in the examples of the patent.

Another process for preparing sausages is disclosed in U.S. Pat. No. 3,482,996 issued Dec. 9, 1996 to Christianson, et al. for "Process for Preparing Dry and Semi-Dry Sausages". In this patent, the meat compositions include dehydrated, spun, edible protein fibers or dehydrated fibrous products derived from spun, edible protein fibers to substantially reduce drying time. The fibers allegedly take up the moisture which is typically removed in the drying room.

"Preparation of Partially Dehydrated Meat Products" is discussed in U.S. Pat. No. 4,265,918 issued to Kueper, et al. on May 5, 1981. The technique discussed in this patent includes immersion of the meat product in a curing solution, followed by vacuum dehydration. The initial hydration step is to about 105–125% of the products' original weight, followed by vacuum treatment to reduce the overall product weight to 70–95% of its original weight. The process is especially well suited for sliced meat products, like bacon.

Yet another process is described in Kentor's U.S. Pat. No. 4,279,935 issued Jul. 21, 1981 for "Dry Sausage Processing With Added Acid". In this process, bactericides and bacteriostats are first added to the meat, followed by treatment with an acidic mixture to reduce the pH to about 5.7. The sausage is then heated to at least 58° C. and control dried to reduce the average moisture level to about 35%. The drying time is on the order of 5–20 days.

Another well-known process is to form meat loaves, bacon analogs and the like using an extruder to form sheets of the meat mixtures. For bacon analogs, the extrusion can be of multiple layers. The sheets of meat products are cooked and then sliced, e.g. to prepare products resembling bacon and having alternating fat appearing and meat appearing layers. Examples of such processes are discussed in the following U.S. Patents: U.S. Pat. No. 5,236,731 issued Aug. 17, 1993 to Heinz Becker for "Process For The Manufacture Of Sliceable, Casing Free Sausage"; U.S. Pat. No. 4,667,369 issued May 26, 1987 to Eugene F. Felstehausen for "Extrusion Apparatus For Ground Meat"; U.S. Pat. No. 4,530,132 issued Jul. 23, 1985 to Richard C. Wagner for "Meat Loaf Forming Apparatus"; U.S. Pat. No. 4,305,965 issued on Dec. 15, 1981 to Earl J. Cheney for "Bacon And Meat Analogues"; U.S. Pat. No. 4,260,640 issued Apr. 7, 1981 to Hartmann, et al. for "Moulding Food Products"; U.S. Pat. No. 4,200,959 issued May 6, 1980 to Earl J. Cheney for "Apparatus For Forming Bacon Product Analogues And The Like"; U.S. Pat. No. 4,196,222 issued on Apr. 1, 1980 to Earl J. Cheney for "Process For The Preparation Of Meat And Bacon Analogues"; and U.S. Pat. No. 4,166,138 issued on Aug. 28, 1979 to Ziminski, et al. for "Preparation Of Bacon-Like Meat Analog".

In addition to the prior art described above, applicants are also aware that spiral conveyor equipment is known for a variety of food preparation processes. In such equipment, a food product may be frozen or heated as it moves along a conveyor which forms a number of tiers or levels within a spiral system.

An example of such a spiral system is shown in U.S. Pat. No. 4,079,666 issued Mar. 21, 1978 to Plemons, et al. for "Apparatus for Treating Baked Products In Order to Improve the Shelf Life Thereof". Pizza crusts are treated with ethyl alcohol after they have been cooled in a spiral path. The spiral cooler is advantageously used to reduce the size of the area required for cooling and for control of the temperature of the pizza crusts exiting the cooler by taking advantage of the ability to control conveyor speed and air temperature within the enclosure.

Cooking of food products using spiral devices is shown in U.S. Pat. No. 5,078,120 issued Jan. 7, 1992 to Hwang for "Cooking Oven for Slow Cooking of Food Products" and in Reissue 35,259 (originally U.S. Pat. No. 4,582,047) issued Jun. 4, 1996 to Williams for "High Humidity Steam Cooker With Continuously Running Conveyor". In the former, the cooking chamber (using steam or hot air) is divided into high pressure and low pressure areas for improving the efficient heat transfer therein. The food products discussed include chicken or poultry parts, hamburger patties, fish patties, vegetable foods and other food products which may be cooked in a predominantly steam atmosphere. In the latter patent, continuously operable spray detergent cleaning baths are used with a spiral steam cooker equipped with two separate steam sources. This patent also focuses on the cooking of meat, produce, fish or poultry with the steam pressure exceeding one atmosphere, at 100° C. and 100% humidity.

While these prior art processes may have proved successful for the stated purposes, there are important steps which can still be taken in improving the quality and the manufacturing of dry or semi-dry sausages. In the present case, such an improvement is made in connection with pepperoni, especially the type of pepperoni which is to be used in large quantities for the manufacture of pizzas. The present prior art practice is to prepare the pepperoni using conventional processes employing blending, stuffing the meat mixture into casings, cooking a meat mixture, and curing, following which the product is thinly sliced. The thin slices are then placed on top of the pizza for packaging.

Because the drying and curing process requires from several days to several weeks, production capacity for a manufacturing facility is limited to the amount of space allocated to the drying process. This process is capital intensive, and requires a tremendous amount of product to be held in. process at any given period of time. These current processes require the pepperoni to be held in its casing during the curing and drying phase, thereby reducing the rate at which moisture can be removed from the product and adding to manufacturing cost. Holding the pepperoni in its casing during drying also disallows the ability to slice or dice the product prior to drying, which would increase the surface area of the product and aid in moisture removal. Accordingly, a method of manufacturing pepperoni that overcomes these disadvantages would be a significant advance in this art.

FEATURES AND SUMMARY OF THE INVENTION

A principle feature of the present invention is to provide a manufacturing process for preparing and drying pepperoni.

Another feature of the present invention is to provide a cured pepperoni product which flows easily and which may be evenly spread on other food items, such as pizza.

A different object of the present invention is to employ a spiral drying system for drying pepperoni, which has been prepared for drying by blending uncooked meat products and spices and cooking the meat mixture without stuffing it into casings. In the present process the blended, uncooked meat is extruded onto a sheet for cooking. The pepperoni is sliced or diced after it is cooled to a temperature which facilitates this process The temperature and humidity of the air flow within a spiral system used to dry the sausage is controlled.

Yet another object of the present invention is the preparation of pepperoni in a relatively small amount of manufacturing space and in a minimal amount of time.

How these and other objects of the present invention are accomplished will be described in the following "Detailed Description of the Preferred Embodiment". Generally, however, they are accomplished by a process which first includes manufacturing a cooked pepperoni. This process comprises formulating a meat mixture to the desired specification and initially grinding the meat (for example beef and/or pork) to a size no greater than about one-half (½) inch. The meat is then added to a blender and mixed with salt, culture, water and spices, oleoresins, dextrose, and the like. Blending is carried out for up to about 5 minutes, after which a second grinding occurs, this time to a size no greater than ³⁄₁₆". Bone is typically eliminated at this stage. Meat temperature is maintained below 40° F. in the preferred blending and grinding process. Following the second grinding step, the meat mixture is extruded onto a screen at a thickness of about three inches (3") and is transferred to ovens where it is fermented or cooked. In the present invention, the cooked sausage is thereafter chilled to an internal temperature of less than about 35° F., following which the cooked, chilled meat mixture is sliced or sliced and diced. The pepperoni is then transferred to the conveyor of a spiral dryer where it is exposed to air maintained between about 50 and 120° F. and a relative humidity of less than about 30% for a time of about ½ to 1½ hours. Air flow through the dryer is on the order of 400–500 cubic feet per minute at a linear air flow over the pepperoni of about 3–15 feet per second. Moisture in the meat product is reduced to a ratio of less than or equal to 1.6:1 with respect to protein. The pepperoni is then conveyed to a chiller, where it is chilled or frozen for packaging and subsequent transfer to the customer or pizza preparation line. Other ways in which the features of the present invention can be accomplished will become apparent to those skilled in the art after they have read this specification. Such other ways are deemed by us to fall within the scope of our invention if they fall within the scope of the claims which follow.

DETAILED DESCRIPTION OF THE PREFERRED EMBODIMENT

Figure 1:
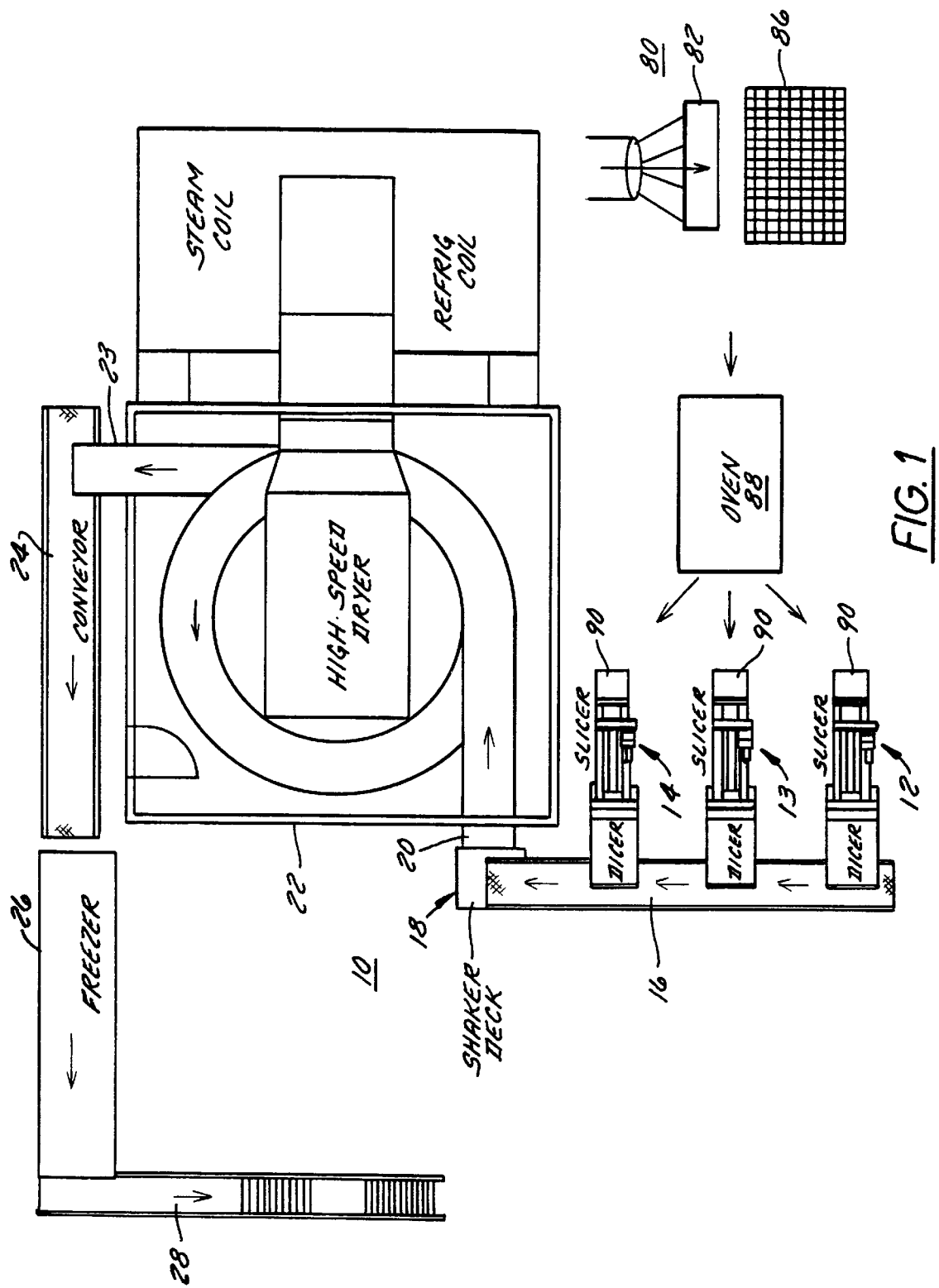
FIG. 1 is a top schematic view of the equipment used to carry out the pepperoni slicing, dicing, drying and freezing steps of the most preferred form of the present invention.

Before proceeding to a description of the preferred embodiment, several general comments can be made about the applicability and scope thereof.

First, the particular meat mixture, including spices, flavorings, salt, cultures and the like can be widely varied by those skilled in the art, and no claim is made herein to any particular sausage formulation separate and apart from the processing techniques described later.

Second, while particular grind sizes will be referred to for various stages of the process, these sizes can also be varied by those skilled in the art who would also appreciate the corresponding need for further process modifications, for example in connection with times and temperatures.

Third, certain manufacturers, model names and numbers are given for machinery used in the most preferred form of the invention, but other machinery can be substituted, as will be appreciated by those skilled in the art.

Fourth, certain ranges are given for the humidity, temperature, conveyor speed, and air flow characteristics for the most preferred embodiment, based again on the particular volumes desired, space requirements and other needs of the assignee of the invention. After reading this specification, one skilled in the art will understand that the selection of optimum numbers for these variables can be made once the plant and overall process parameters of a particular processing installation are known.

Fifth, preferred systems are disclosed for controlling the temperature and the humidity of the air conveyed to and removed from the housing for the spiral conveyor tiers. These also can be varied by substituting, for example, chemical for mechanical systems or direct for recycle heating of the air, depending on normal plant considerations of energy cost, plant lay-out and the like, and generally the temperature and humidity values used in the process tolerate some ongoing variability due to, for instance, changes in ambient plant temperatures and humidity and other related factors.

Proceeding now to a description of the most preferred embodiment, the process will be described first, and then several drawings will be used to illustrate a preferred plant layout and a preferred technique for modifying a conventional spiral freezer so that it can be used as a sausage drying device in the present invention.

The first step of the process is the formulation of the meat mixture (e.g. beef, pork, poultry, etc.) to the desired specification, including the specification for fat. These specifications may be established by the processor or the customer. Initially, the meat is course ground as is well known in the pepperoni industry. In most cases this will be to a size no greater than about ½ inch.

The formulated meat is next placed into a blender where it is mixed with the desired salt, culture, water and spices, including any specified oleoresins, and dextrose. Further detail is not required here, as the recipe or formulation in and of itself does not form part of the present invention. As is the case with current practice, the blender may operate for about five minutes to thoroughly mix the ingredients.

Following blending, the meat mixture is passed through a final grinder, where it is reduced to a size no greater than about 3/16". A bone elimination system may be used here, if bone has not been eliminated earlier in the process. When the meat mixture exits the final grind station, it should optimally be at about 40° F. or less.

The next step in the process is to mechanically extrude the mixture onto screens. One exemplary process extrudes the sausage in sheets about two to four inches (2–4") in depth and up to twelve inches (12") wide by thirty-six inches (36") long. The sheet size, including depth can be varied, with corresponding changes in the cooking and fermenting parameters discussed. The racks are transferred to ovens where fermentation takes place with the sausage temperature held at around 100° F. for twelve to eighteen (12–18) hours. Air temperature should be kept at about 90° F. to 110° F. In a subsequent cooking step for 3–4 hours at about 140° F., the internal temperature of the sausage is raised to 120° F. or higher for an hour or longer, preferably to above 128° F.

The cooked sausage is then cooled to an internal temperature of 35° F. or less. The cooled sausage is sliced or sliced and diced, most preferably diced, using, for example an Urschel Model M dicer, to a size of about 5/16". If slicing is employed, about 5/16" is also preferred. The size is not to be deemed as limiting the scope of the invention. For example, the slice or dice size could be ¼" or 3/8", if desired.

After slicing or slicing and dicing, the meat is placed on the continuous conveyors of specially configured spiral dryers. One type of spiral system which may be modified for use in the present invention is the Frigoscandia Gyro Compac Spiral Conveyor Model GC106. In this device, product enters at the bottom of the housing and spirals about a number of conveyor tiers and exits near the top of the equipment. The number of tiers is readily determined by those familiar with this technology by calculating the initial moisture level, the desired final moisture level, the relative humidity of the air, the total amount of water which must be removed, the temperature, and the conveyor speed. In the system of the present invention, one appropriate conveyor provides approximately 7,000 feet of product area, with an average area per tier of 190 square feet and 38–42 tiers.

The conveyor is moved at speeds which may be controlled but in the present invention, it is preferable to use a conveyor speed of approximately 3 to 5 feet per minute. Pressure drops of air through the stack of conveyor tiers is about 2" of water, and an air flow of 3–13 linear feet per minute of air is acceptable. optimally, the spiral conveyor and air flow system is used to reduce the amount of moisture contained in the diced or sliced product, from initial levels on the order of 50% to a final moisture content where the ratio of moisture to protein is equal to 1.6:1. This is accomplished by exposing the pepperoni within the conveyor to air which has been dried to a relative humidity of less than about 30% for up to about 1.5 hours to turbulent air flow, thirty minutes to one hour being preferred. The temperature of the air entering the dryer is maintained between about 50° F. to 120° F.

A large capacity air-handling system would provide a capability of moving about 130,000 cubic feet per minute of air. The system involves the use of a variable or fixed speed fan positioned inside the drying cabinet. The fan pushes or draws air through the stack of conveyor tiers.

Another characteristic of the drying process is to pass the air flow down through the center of the spiraling tiers and out radially over the food product. In and of itself, this air distribution system is known, but its use for drying pepperoni is not. The air would enter the top of the cabinet, being exposed in its driest state to product from which some moisture has already been removed. As the air picks up moisture and travels downwardly further into the dryer, relatively higher moisture levels are encountered.

As will become more apparent when the plant layout is described later in this application, the appropriate characteristics for the air entering the dryer is accomplished by the use of both steam coils and refrigeration coils. It should be remembered at this point, that most spiral systems employed to this time are used either for freezing product, or for cooking products as illustrated by the prior art references discussed earlier in this specification. For this application, and depending on ambient conditions existing in the plant, there may be a need to heat the air, or to cool it, and refrigeration systems are highly desirable to assist in water removal as is well known in the air-handling art. It is also possible to modify the system which will be described shortly to include chemical desiccant systems for moisture removal. Further information regarding the dryer will be provided in a subsequent section of the specification.

Returning to the overall process characteristics, the dried pepperoni is conveyed from the upper part of the drying cabinet to a freezing tunnel or other system for chilling or freezing the product for packaging or transfer for use with the particular final product, such as pizza. While drying can be completed in about ½ hour to about 1½ hours, the time required for freezing or chilling the product, preferably to less than about 0° F., will be dependent upon the length of the freezer tunnel, the temperatures maintained therein and conveyor speeds.

Proceeding now to a description of the drawings, FIG. 1 shows one plant lay-out for carrying out the latter steps of the process of the most preferred embodiment of the prevent invention. The blending equipment is not shown, as such equipment is well known. In FIG. 1, the slicing and dicing, drying and cooling system 10 is shown to include a series of dicing machines 12, 13 and 14, each of which deposits diced pepperoni onto a transfer conveyor 16. Conveyor 16 terminates at a shaker deck 18 where product is uniformly distributed onto the continuous conveyor 20 of the high speed drying unit 22. The spiral nature of the high speed dryer 22 is schematically illustrated in this drawing with only a single spiral tier, but as indicated above, numerous tiers are used. See also FIG. 3. The output from the high speed dryer 22 is deposited on another transfer conveyor 24 for being moved toward freezer 26. As product passes through the freezer 26, it is cooled as indicated above. Finally, cooled product is deposited on a processing conveyor 28 for transport to scales, packaging systems and the like. The extrusion equipment is illustrated at area 80 on FIG. 1. The feed tube 82 of the extruder 84 and screen 86 are illustrated diagrammatically. The cooking area 88 is illustrated in schematic form only, as that equipment, in and of itself, is conventional. In our preferred cooking ovens, up to twenty-four of the screens 86 are contained in a rack within cooking ovens 88. Slicers 90 are located in front of the dicers 12, 13 and 14.

Figure 2:
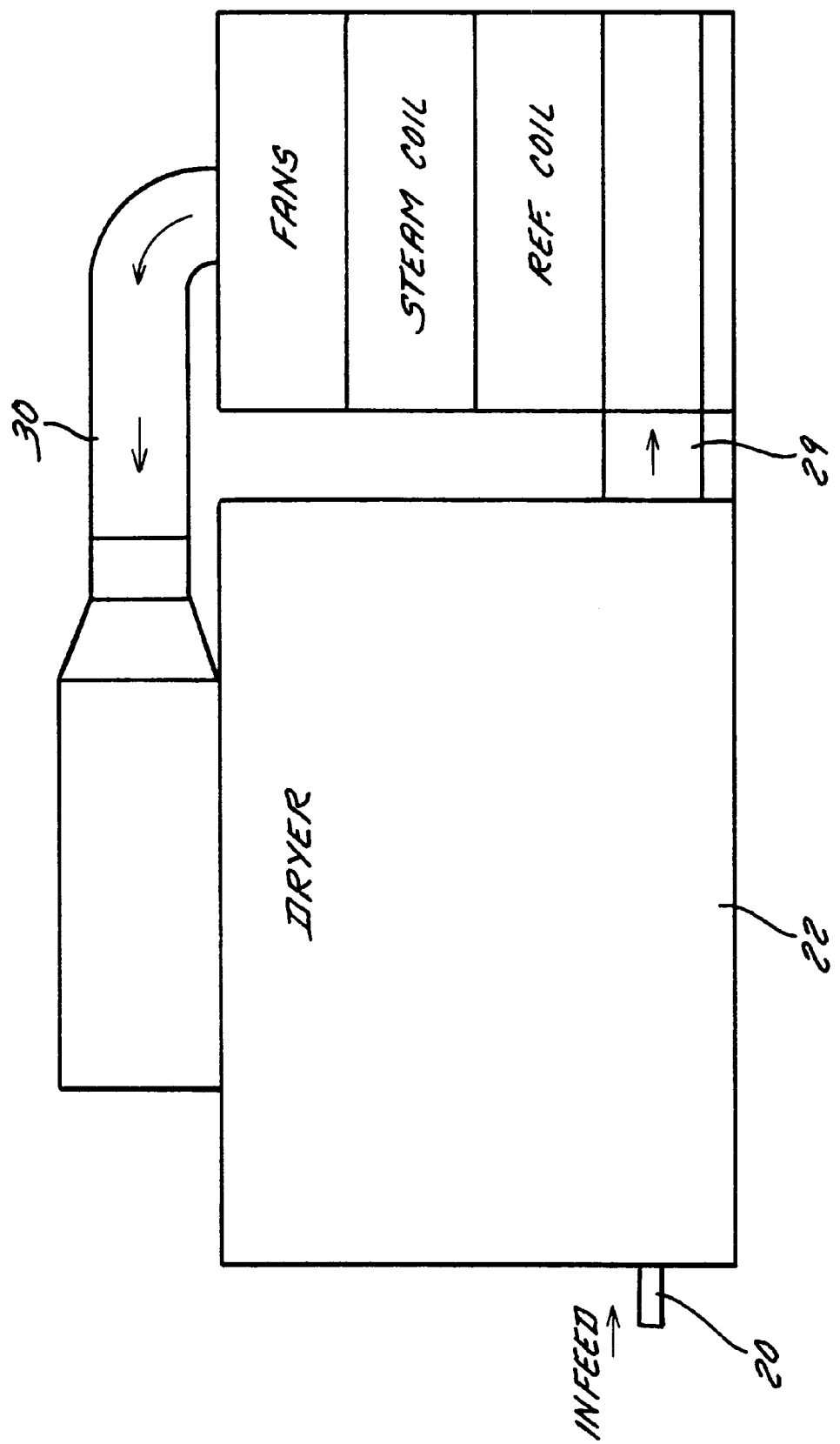
FIG. 2 is a side view of the spiral dryer of the most preferred embodiment of the present invention.

FIG. 2 shows in schematic form the infeed conveyor 20, the high speed dryer 22 and two air ducts 28 and 30. Duct 28 is a return duct leading from the lower portion of the dryer cabinet while duct 30 is shown at the top of the unit. As explained previously, the warmed, and dry air enters dryer 22 from the top thereof passes downwardly through the coils or tiers of the dryer and leaves through the bottom. Such air flow is schematically illustrated by the arrows in this figure.

FIG. 2 also schematically illustrates the refrigeration coils and steam coils used in the present invention, as well as the fans located at the top of the coil stack for directing air into duct 30. The refrigeration coils are used primarily to remove humidity from the air (and may be replaced by chemical desiccant systems as mentioned above), following which the air is moved through steam coils to raise it to the appropriate temperature.

Figure 3:
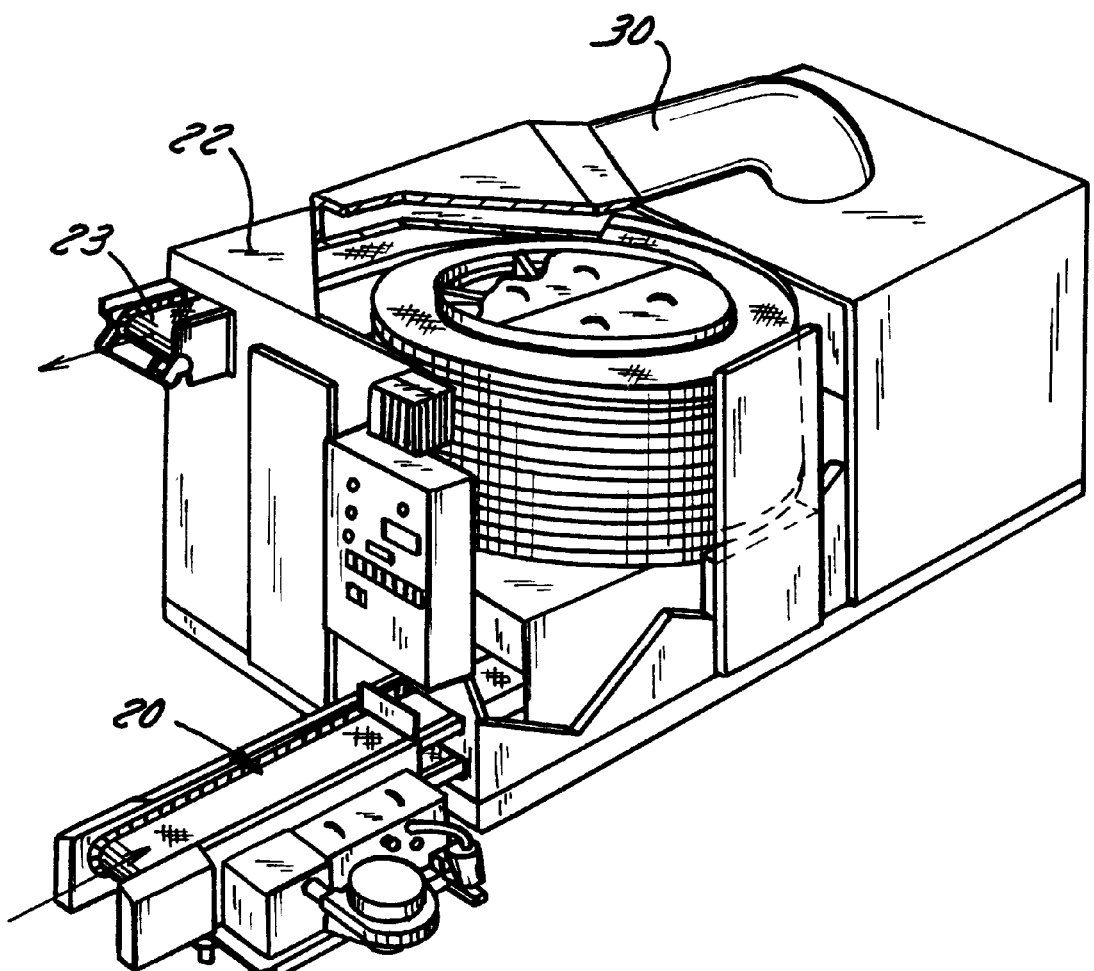
FIG. 3 is a schematic illustration of the spiral dryer used in the most preferred embodiment of the present invention, with parts broken away to illustrate internal components.

Finally, FIG. 3 is a schematic illustration of the dryer 22 with the infeed conveyor and output conveyors 20 and 23, respectively. The figure is cut away to show in schematic form the spiral nature of the tiered conveyor located therewithin. As indicated above, in the most preferred form of the invention, 38–40 tiers are used, more than is shown in the schematic illustration.

Although the present invention has primary applicability for the preparation of dry or semi-dry sausages, other types of food products may be dried at an accelerated rate in the dryer 22. By the use of such a dryer, the overall processing time for making pepperoni is dramatically reduced, but just as importantly, the flowability of the resulting product is increased. For example, a plurality of diced pepperoni pieces can be squeezed together under hand pressure and separate freely thereafter, unlike the oily feel and tendency to clump which would occur when using sliced pepperoni made by conventional processes. Substantial processing time and the cost associated therewith are reduced, using a system which occupies relatively little plant space and which is highly reliable.

Now that the equipment and the processes have been described in sufficient detail to enable one skilled in the art to practice the preferred form of the invention, it will be even more apparent how variations of time, temperature and humidity can be made by those skilled in the art to take into account a particular processing environment. For example, relatively more heat must be added to the air flow in colder climates, while if processing were to take place in humid, warm environments, such as the southern part of the United States, especially during the summer, additional refrigeration capacity might be needed to lower humidity to a level of less than 30%. It might also be necessary to maintain the air in a cooled condition downstream of the refrigeration coils if ambient temperatures are in excess of 90° F., the upper end of the preferred processing range.

While the foregoing invention has been described in connection with this preferred embodiment, it is not to be limited thereby but is to be limited solely by the scope of the claims which follow.

What is claimed is:

1. A process of preparing pepperoni comprising the steps of:

preparing a pepperoni meat mixture, extruding the mixture into sheet form, the sheet having a depth of two inches or more, fermenting the mixture at a temperature of about 100° F. for 12 hours or more and cooking the mixture at a temperature of 120° F. or higher for an hour or more to produce a sheet of cooked sausage;

cooling the cooked sausage to a temperature sufficiently low to permit slicing;

slicing the sausage;

dicing the sausage;

depositing the diced sausage onto the conveyor of a spiral dryer;

passing conditioned air into and through the spiral dryer, the conditioned air having a relative humidity below about 30% and a temperature in the range of about 50° F. to about 120° F. when introduced into the spiral dryer;

conveying the diced sausage through the spiral dryer for a time sufficient to reduce the moisture to protein ratio to 1.6:1 or less.

2. The process of claim 1 wherein the mixture is cooked at a temperature exceeding 128° F. for an hour or more.

3. The process of claim 1 wherein the cooling step is carried out until the cooked sausage has an internal temperature of 35° F. or less.

4. The process of claim 1 wherein the conditioned air is passed through the dryer at a volume sufficient to cause a linear air flow velocity over the diced sausage of more than 3 feet per second as the diced sausage is being conveyed through the dryer.

5. The process of claim 4 wherein the linear air flow velocity exceeds 3 feet per second but is less than about 15 feet per second.

6. The process of claim 1 wherein the spiral dryer includes a plurality of conveyor tiers arranged about a vertical axis, a conveyor entrance at a lower part of the dryer and a conveyor exit at an upper part of the dryer, and wherein the conveying step is carried out by introducing the sausage into the dryer at the conveyor entrance and removing it at the conveyor exit.

7. The process of claim 1 wherein the conditioned air for the spiral dryer is introduced at the top thereof and is removed from the bottom thereof.

8. The process of claim 6 wherein the conditioned air for the spiral dryer is introduced at the top thereof and is removed from the bottom thereof.

9. The process of claim 1 wherein the dried pepperoni is cooled after it leaves the spiral dryer.

10. The process of claim 1 wherein the dried pepperoni is frozen after it leaves the spiral dryer.

11. The process of claim 1 wherein the diced pepperoni is passed through the spiral dryer in less than 1½ hours.

12. The process of claim 1 wherein the cooked sausage is sliced to a thickness size of 5/16" or less.

13. The process of claim 1 wherein the spiral dryer has a plurality of conveyor tiers arranged about a vertical axis and wherein the conditioned air is passed downwardly about the vertical axis and thereafter passed radially outwardly across the diced sausage as it is conveyed along the conveyor tiers.

14. A process for making diced pepperoni comprising blending a pepperoni meat mixture with water, salt, culture and seasonings and other ingredients used to make pepperoni, extruding the blended mixture onto screens, fermenting and cooking the sausage resulting from the extrusion step while in sheet form, cooling the cooked sausage to below 35° F., slicing the cooled sausage to a thickness of about 5/16", thereafter dicing the cooled sausage to a cube size of about 5/16", placing the diced sausage on the moving conveyor of a spiral dryer and drying the diced sausage to a moisture to protein ratio of 1.6:1 or less in less than 1½ hours by passing conditioned air over the sausage in the spiral dryer, the air introduced to the spiral dryer being at a relative humidity of 30% or less and a temperature in the range of about 50° F. to 120° F.

15. The process of claim 14 wherein the conditioned air passed over the sausage in the spiral dryer is within the range of about 3–15 feet per second.

16. A system for making dried pepperoni comprising:

ovens for fermenting and cooking a pepperoni meat mixture to produce cooked pepperoni;

a chiller for cooling the fermented and cooked pepperoni;

slicers for the cooled pepperoni;

dicers for dicing the sliced cooled pepperoni;

a spiral dryer having a conveyor passing therethrough in a plurality of spirally-arranged tiers;

air conditioning means coupled to the spiral dryer for introducing conditioned air having a relative humidity of less than about 30% and a temperature in the range of about 50° F. to 120° F.

17. The system of claim 16 wherein the air conditioning means includes refrigeration coils for reducing the humidity of air passing through the air conditioning means and heater coils for raising the temperature of air passing therethrough.

18. The system of claim 16 further including a cooler for reducing the temperature of the dried, diced pepperoni after it leaves the spiral dryer.

19. A system for making dried pepperoni comprising:

an extruder for extruding sheets of a blended pepperoni meat mixture onto screens;

ovens for fermenting and cooking the sheets to prepare cooked pepperoni;

chillers for cooling the cooked pepperoni;

slicers for slicing the cooled pepperoni;

dicers for dicing the sliced, cooled pepperoni;

a spiral dryer having a conveyor passing therethrough in a plurality of spirally-arranged tiers;

air conditioning means coupled to the spiral dryer for introducing conditioned air having a relative humidity of less than about 30% and a temperature in the range of about 50°F. to 120° F.

20. The system of claim 19 wherein the air conditioning means includes refrigeration coils for reducing the humidity of air passing through the air conditioning means and heater coils for raising the temperature of air passing therethrough.

21. A process for preparing pepperoni comprising the steps of:

preparing a pepperoni meat mixture, fermenting the mixture at a temperature of about 100° F. for 12 hours or more, cooking the mixture at a temperature above 120° F. for an hour or more to prepare a cooked sausage;

cooling the cooked sausage to a temperature sufficiently low to permit slicing;

slicing the cooled sausage;

depositing the sausage slices onto the conveyor of a spiral dryer;

passing conditioned air into and through the spiral dryer, the conditioned air having a relative humidity below about 30% and a temperature in the range of about 50° F. to about 120° F. when introduced into the spiral dryer;

conveying the sausage slices through the spiral dryer for a time sufficient to reduce the moisture to protein ratio to 1.6:1 or less.

22. The process of claim 21 wherein the sliced sausage is diced before it enters the spiral dryer.

23. The process of claim 22 wherein the conditioned air is passed through the dryer at a volume sufficient to cause a linear air flow velocity over the diced sausage of more than 3 feet per second as the diced sausage is being conveyed through the dryer.

24. The process of claim 23 wherein the linear air flow velocity exceeds 3 feet per second but is less than about 15 feet per second.

25. The process of claim 21 wherein the spiral dryer includes a plurality of conveyor tiers arranged about a vertical axis, a conveyor entrance at a lower part of the dryer and a conveyor exit at an upper part of the dryer, and wherein the conveying step is carried out by introducing the sausage slices into the dryer at the conveyor entrance and removing it at the conveyor exit.

26. The process of claim 21 wherein the conditioned air for the spiral dryer is introduced at the top thereof and is removed from the bottom thereof.

* * * * *